United States Patent Office 3,413,345
Patented Nov. 26, 1968

3,413,345
N-ARALKENYL-LOWER ALKANOIC
ACID AMIDINES
Robert Paul Mull, Florham Park, N.J., assignor to Ciba Corporation, New York, N.Y., a corporation of Delaware
No Drawing. Filed Sept. 27, 1965, Ser. No. 490,669
5 Claims. (Cl. 260—564)

ABSTRACT OF THE DISCLOSURE

N-aralkenyl-lower alkanoic acid amidines, e.g. those of the formula

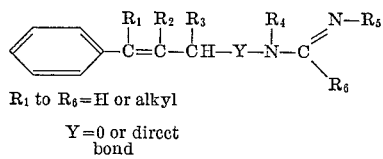

$R_1$ to $R_6$ = H or alkyl

Y = 0 or direct bond and salts thereof exhibit hypotensive effects.

---

The present invention concerns and has for its object the provision of aralkenyl-amidines and salts thereof, as well as methods for their preparation.

More particularly the invention relates to compounds having the Formula I

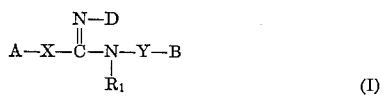

in which one of the groups A, B and D stands for the moiety of the Formula II

and the other for hydrogen or lower alkyl, in which formulae each of $R_1$, $R_3$, $R_4$ and $R_5$ stands for hydrogen or lower alkyl, $R_2$ for carbocyclic aryl, X and Y for a direct bond or X for a methylene group or Y for an oxygen atom, and salts thereof.

The carbocyclic aryl group $R_2$ is more especially mono- or bicyclic carbocyclic aryl, above all phenyl, as well as 1- or 2-naphthyl, which is unsubstituted or may have one or more than one of the same or of different substituents attached to any of the positions available for substitution. Such substituents are, for example, lower alkyl, e.g. methyl, ethyl, n- or i-propyl, n-, i-, sec. or tert. butyl, etherified hydroxy or mercapto, especially lower alkoxy, e.g. methoxy, ethoxy, n- or i-propoxy or n-butoxy, as well as lower alkenyloxy, e.g. allyloxy, or lower alkylenedioxy, e.g. methylenedioxy, lower alkyl-mercapto, e.g. methyl- or ethyl-mercapto, esterified hydroxy, especially halogeno, e.g. fluoro, chloro or bromo, as well as trifluoromethyl, or lower alkoxy-carbonyloxy, e.g. methoxy- or ethoxy-carbonyloxy, or lower alkanoyloxy, e.g. acetoxy or propionyloxy, acyl, such as lower alkanoyl, e.g. acetyl or propionyl, nitro, amino, preferably tert. amino, such as di-lower alkylamino, e.g. dimethylamino or diethylamino.

Preferred aryl, groups $R_2$ are phenyl, (lower alkyl)-phenyl, (lower alkoxy)-phenyl, (halogeno)-phenyl, (trifluoromethyl) - phenyl, (lower alkoxy - carbonyloxy) - phenyl, (lower alkanoyloxy)-phenyl, (lower alkanoyl)-phenyl and (di-lower alkylamino)-phenyl.

The groups $R_1$, $R_3$, $R_4$ and $R_5$ as well as two of the groups A, B and D stand primarily for hydrogen, but may also be one of the lower alkyl groups exemplified above. They preferably contain one to four carbon atoms and are particularly methyl groups.

The compounds of the invention exhibit valuable pharmacological properties. Apart from their activity to increase the coronary blood flow, they show primarily hypotensive effects, which are of quick onset and considerable duration. This can be demonstrated in animal tests using, for example, normotensive anesthetized cats and dogs as well as unanesthetized normotensive and renal hypertensive dogs as test objects. The new compounds are, therefore, useful as hypotensive agents and coronary dilatants. Furthermore, they are useful as intermediates in the preparation of other valuable, especially pharmacologically active compounds.

Particularly useful are compounds for the Formula I, in which $R_2$ stands for phenyl, (lower alkyl)-phenyl, (lower alkoxy)-phenyl, (halogeno)-phenyl, (trifluoromethyl) - phenyl, (lower alkoxy - carbonyloxy) - phenyl, (lower alkanoyloxy)-phenyl, (lower alkanoyl)-phenyl and (di-lower alkylamino)-phenyl, each of $R_1$, $R_3$, $R_4$ and $R_5$ for hydrogen or alkyl with 1 to 4 carbon atoms, X and Y for a direct bond or X for a methylene group and, in case B stands for the group of Formula II, Y also for an oxygen atom and pharmaceutically acceptable acid addition salts thereof.

Especially mentioned are compounds of the Formula III

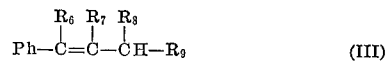

in which Ph stands for phenyl, (lower alkyl)-phenyl, (lower alkoxy)-phenyl, (halogeno)-phenyl or (trifluoromethyl)-phenyl, each of $R_6$, $R_7$ and $R_8$ for hydrogen or methyl and $R_9$ for one of the groups

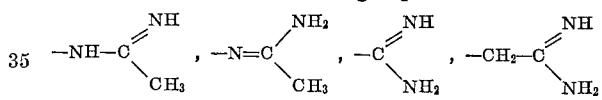

or

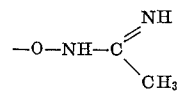

and pharmaceutically acceptable acid addition salts thereof, and in particular the hydrochloride and hemisulfate of compounds having the Formula IV

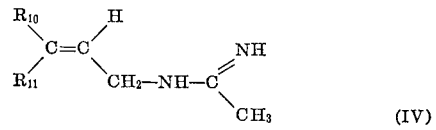

in which one of $R_{10}$ and $R_{11}$ stands for hydrogen and the other for phenyl, which, when injected intravenously or into a loop of the small intestine of anesthetized normotensive dogs at a dose between about 1 and 10 mg./kg./day or given orally in about the same dosage range to unanesthetized normotensive or renal hypertensive dogs, exhibit an outstanding hypotensive effect.

The compounds of this invention are prepared according to known methods. For example, they are prepared by the process wherein, (a) An A—X-formic acid nitrile, D-amide, D-thioamide, D-imino ether, D-imino thioether or D-imino halide is reacted with the amine $R_1$—NH—Y—B or (b) An A—X-formic acid nitrile, $R_1$,BY-amide, $R_1$,BY-thioamide, BY-imino ether, BY-imino thioether or BY-imino halide is reacted with the amine D-NH$_2$ and, if desired a resulting A—X-formic acid D,$R_1$-amidine or hydroxamidine is reacted with a reactive ester of alcohol B—OH and/or a resulting base is converted into a salt or a resulting salt is converted into the corresponding base or into another salt and/or a resulting mixture of isomers is separated into the single isomers.

The imino ethers used are, for example, the lower alkyl or aralkyl ethers, such as the methyl, ethyl, propyl, butyl or benzyl ethers. The imino halides are preferably the chlorides or bromides. A reactive ester of the alcohol B—OH (in which B is different from hydrogen) is, for example, that of a mineral acid, such as a hydrohalic or sulfuric acid, or that of a sulfonic acid, such as a lower alkane or benzene sulfonic acid, e.g. methane, ethane, benzene or p-toluene sulfonic acid.

The above-mentioned reactions are carried out according to standard methods, in the presence or absence of diluents, preferably such as are inert to the reagents and are solvents thereof, of catalysts, condensing agents and/or inert atmospheres, at low temperatures, room temperature or elevated temperatures, at atmospheric or super atmospheric pressure. A catalyst useful in the reaction of the nitriles is, for example, a Lewis acid, such as aluminum chloride, and a condensing agent useful in the reaction of the amides, for example, a phosphorus oxyhalide or trihalide, and in the reaction with the ester of B—OH, for example, a base, such as a tertiary nitrogen compound or an alkali or alkaline earth metal carbonate or bicarbonate, e.g. pyridine or sodium, potassium or calcium carbonate or bicarbonate.

The compounds of the invention are obtained in the free form or in the form of their salts, depending on the conditions under which the process is carried out; the salts are also included in the present invention. Salts that are obtained can be converted into the free bases in known manner, for example, with alkalis or ion exchangers. Free bases that are obtained can be converted into salts by reaction with inorganic or organic acids, especially those that are suitable for the formation of therapeutically useful salts. Such acids are, for example, hydrohalic acids, e.g. hydrochloric or hydrobromic acid, sulfuric, phosphoric, nitric or perchloric acid, aliphatic, alicyclic, araliphatic, aromatic, or heterocyclic carboxylic or sulfonic acids, for example, formic, acetic, propionic, succinic, glycollic, lactic, malic, tartaric, citric, ascorbic, maleic, hydroxymaleic, pyroracemic, phenylacetic, benzoic, aminobenzoic, anthranilic, hydroxybenzoic, salicylic, aminosalicylic, embonic, nicotinic, methanesulfonic, ethanesulfonic, hydroxethanesulfonic, ethylenesulfonic, halogenbenzenesulfonic, toluenesulfonic, naphthalenesulfonic and sulfanilic acid; methionine, tryptophan, lysine and arginine.

These or other salts of the new compounds, for example, the picrates, can also be used for purification of the bases obtained: the bases are converted into salts, the salts are separated and the bases are liberated from the salts. In view of the close relationship between the free compounds and the compounds in the form of their salts, whenever a free base is referred to in this context, a corresponding salt is also intended, provided such is possible or appropriate under the circumstances.

The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components may be used in the form of their salts.

For example, the imino halides may be formed in situ from an acid amide or thioamide in the presence of a phosphorus halide or oxyhalide, and acid amides or thioamides may be formed from the corresponding acid esters or halides. The imino ethers are preferably used in the form of their acid addition salts, which also may be the case with the amine reactant. Such salts are especially derived from a mineral acid, such as a hydrohalic, sulfuric, phosphoric or nitric acid. The amines may also be in the form of a metal salt, such as an alkali or alkaline earth metal, e.g. sodium, potassium or calcium salt or a magnesium halide salt. Such metal salts are preferably used in the reaction with the nitriles, which advantageously is followed by the hydrolysis of a metal salt obtained, to the free base.

Mainly, those starting materials should be used in the reactions of the invention that lead to the formation of those compounds indicated above as being specially valuable.

The starting materials are known or, if new, may be prepared according to known methods. Several of the starting materials used are described in co-pending application Ser. No. 322,018 filed Nov. 7, 1963 now U.S. Patent No. 3,252,861.

The starting materials as well as the compounds of the invention may be in the form of mixtures of isomers or of single isomers. Thus, they are preferably in the form of their geometric cis- and trans-isomers. A mixture of such isomers may be separated by fractional crystallization and/or chromatography.

The compounds of the invention can be used in the free form or in the form of their salts, for example, for the manufacture of pharmaceutical preparations containing the said compounds in admixture with organic or inorganic, solid or liquid pharmaceutical excipients suitable especially for enteral but also for parenteral administration. Suitable excipients are substances that do not react with the new compounds, for example, water, gelatine, lactose, starch, stearyl alcohol, magnesium stearate, talc, vegetable oils, benzyl alcohols, gums, propylene glycols, white petroleum jelly and other known medicinal excipients. The pharmaceutical preparations may be, for example, tablets, dragees or capsules, or in liquid form as solutions, suspensions or emulsions. They may be sterilized and/or contain adjuvants, such as preserving, stabilizing, wetting or emulsifying agents, solution promoters, salts for regulating the osmotic pressure or buffers. They may further contain other therapeutically valuable substances. The pharmaceutical preparations are prepared by conventional methods.

The following examples illustrate the invention; temperatures are given in degrees centigrade and all parts mentioned are parts by weight.

Example 1

The mixture of 5.0 g. trans-cinnamylamine, 4.65 g. ethyl acetimidate and 30 ml. ethanol is refluxed for 6 hours and hereupon evaporated in vacuo. The residue solidifies upon addition of petroleum ether and represents the N-(trans-cinnamyl)-acetamidine hydrochloride of the formula

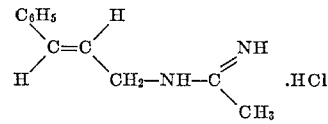

melting at 108–112° after recrystallization from isopropanol-diethyl ether and drying in a high vacuum.

Example 2

Replacing in Example 1 the starting material by the same amount of cis-cinnamylamine and following the procedure given, the N-(cis-cinnamyl)-acetamidine hydrochloride of the formula.

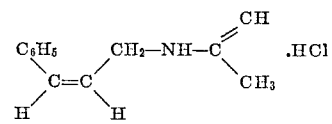

is obtained.

Example 3

Analogous to the method described in Example 1, the following compounds are prepared from equivalent amounts of the corresponding starting materials:
N-(trans-p-methoxy-cinnamyl)-acetamidine, N-(cis-p- methyl-cinnamyl)-acetamidine, N-(trans-m-chloro-cinnamyl)-acetamidine, N-(cis-m-mehtyl-cinnamyl)-acetamidine, N-(trans-p-chloro-cinnamyl)-acetamidine, N-(cis-o,p-dimethyl-cinnamyl)-acetamidine, N-(trans-cinnamyl)-propionamidine, N-(cis-cinnamyl)-formamidine and N-(trans-cinnamyloxy)-acetamidine. The starting material for the latter compound is prepared as follows:

The mixture of 65.2 g. N-hydroxy-phthalimide, 122 ml. triethylamine, 61.0 g. trans-cinnamyl chloride and 600 ml. dimethyl formamide is heated on the steam bath for 2 hours, then cooled and diluted with 100 ml. water. The precipitate formed is filtered off and washed with water to yield the N-(trans-cinnamyloxy)-phthalimide melting at 149–152°.

70.0 g. thereof in 800 ml. methylene chloride are added to a solution of 13.0 g. hydrazine hydrate in 25 ml. methanol and the mixture is stirred at room temperature for 25 hours. Hereupon it is filtered, the residue washed with methylene chloride and the filtrate concentrated in vacuo. The residue is extracted with diethyl ether, the extract acidified with isopropanolic hydrochloric acid, filtered and the residue recrystalized from methanol-ethyl acetate to yield the O-(trans-cinnamyl)-hydroxylamine hydrochloride melting at 192–193°. The free base is obtained from a concentrated aqueous solution of said hydrochloride which is made basic with aqueous potassium hydroxide, extracted with diethyl ether; the extract is then dried and evaporated under reduced pressure.

Example 4

1000 tablets each containing 0.015 g. of the active ingredient.

Material:                                                G.
Trans-cinnamyl-acetamidine hydrochloride __  15.0
Tragacanth _____   3.0
Lactose _____ 123.0
Corn starch_____   7.5
Magnesium stearate _____   1.5
Aqueous ethanol (fifty percent) q.s.

Procedure.—The hydrochloride, the tragacanth and the lactose are mixed in a suitable mixer and granulated with the ethanol. The granulate is passed through a No. 10 screen, dried at room temperature with circulating air, and passed through a No. 16 screen. The screened material is returned to the mixer, the corn starch and the magnesium stearate are added and mixing is continued. The mixture is again passed through a No. 16 screen and compressed into tablets, each weighing 0.15 g., using $^{19}/_{32}$ inch standard, concave punches, uppers bisected.

Several of the starting materials and intermediates used in the process of the present invention are also described in co-pending application Ser. No. 490,135 filed Sept. 24, 1965 and now U.S. Patent No. 3,332,988.

What is claimed is:

1. The compound having the formula

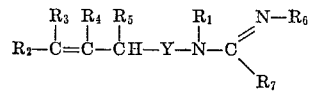

in which each of $R_1$, $R_3$, $R_4$, $R_5$, $R_6$ and $R_7$ stands for hydrogen or lower alkyl, $R_2$ for phenyl, mono- or di-lower alkyl-phenyl, mono-lower alkoxy-phenyl or mono-halogeno-phenyl and Y for a direct bond or an oxygen atom, and a salt thereof.

2. A compound as claimed in claim 1, in which formula $R_2$ stands for phenyl, mono- or di-lower alkyl-phenyl, mono-lower alkoxy-phenyl, or mono-halogeno-phenyl each of $R_3$, $R_4$ and $R_5$ for hydrogen or methyl, $R_1$ and $R_6$ for hydrogen, $R_7$ for methyl and Y for a direct bond or an oxygen atom and a pharmaceutically acceptable acid addition salt thereof.

3. The compound having the formula

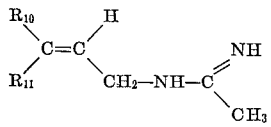

in which one of $R_{10}$ and $R_{11}$ stands for hydrogen and the other for phenyl, the hydrochloride and hemisulfate thereof.

4. The N-(trans-cinnamyl)-acetamidine and the hydrochloride thereof.

5. The N-(cis-cinnamyl)-acetamidine and the hydrochloride thereof.

References Cited

Fanta et al.: "JACS," vol. 78, 1434–7 (1956).

CHARLES B. PARKER, Primary Examiner.

ROBERT V. HINES, Assistant Examiner.